United States Patent
Ishida et al.

(10) Patent No.: US 9,065,091 B2
(45) Date of Patent: Jun. 23, 2015

(54) FUEL CELL

(71) Applicant: HONDA MOTOR CO., LTD., Tokyo (JP)

(72) Inventors: Kentaro Ishida, Wako (JP); Shuhei Goto, Wako (JP); Yukihito Tanaka, Wako (JP); Seiji Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 13/892,309

(22) Filed: May 13, 2013

(65) Prior Publication Data
US 2013/0316261 A1 Nov. 28, 2013

(30) Foreign Application Priority Data

May 25, 2012 (JP) ................................. 2012-119132

(51) Int. Cl.
*H01M 8/02* (2006.01)
*H01M 8/04* (2006.01)
*H01M 8/24* (2006.01)

(52) U.S. Cl.
CPC ........ *H01M 8/04007* (2013.01); *H01M 8/0202* (2013.01); *Y02E 60/50* (2013.01); *H01M 8/242* (2013.01); *H01M 8/0267* (2013.01); *H01M 8/0273* (2013.01); *H01M 8/0284* (2013.01)

(58) Field of Classification Search
CPC ... Y02E 60/50; Y02E 60/521; H01M 8/0273; H01M 8/0228; H01M 8/0276; H01M 8/0221; H01M 8/026; H01M 8/0202; H01M 8/2485; H01M 2/08; H01M 8/246; H01M 8/247
USPC ......................................................... 429/434
See application file for complete search history.

(56) References Cited

U.S. PATENT DOCUMENTS

| | | | |
|---|---|---|---|
| 2010/0248087 A1* | 9/2010 | Tsuji et al. ..................... | 429/535 |
| 2013/0004877 A1* | 1/2013 | Takeguchi ..................... | 429/437 |

FOREIGN PATENT DOCUMENTS

JP 2006-331783 12/2006

* cited by examiner

*Primary Examiner* — Cynthia H Kelly
*Assistant Examiner* — Monique Wills
(74) *Attorney, Agent, or Firm* — Mori & Ward, LLP (57) ABSTRACT

A fuel cell includes an electrolyte-electrode assembly, a frame member, a first separator, and a second separator. The frame member is provided to face a first surface of the second separator and includes a resin wall which forms a periphery of a first reactant gas passage. The resin wall has a thin-walled portion which overlaps with a cooling medium connecting portion in a stacking direction and which protrudes toward the first reactant gas passage in the stacking direction by a first dimension from a surface of the frame member. Another portion of the resin wall protrudes toward the second separator in the stacking direction by a second dimension from the surface of the frame member. The first dimension is smaller than the second dimension.

4 Claims, 10 Drawing Sheets

BACKGROUND ART

FUEL CELL

CROSS-REFERENCE TO RELATED APPLICATIONS

The present application claims priority under 35 U.S.C. §119 to Japanese Patent Application No. 2012-119132, filed May 25, 2012, entitled "Fuel Cell." The contents of this application are incorporated herein by reference in their entirety.

BACKGROUND OF THE INVENTION

1. Field of the Invention

The present disclosure relates to a fuel cell.

2. Discussion of the Background

For example, a solid polymer electrolyte fuel cell serves as a generation unit cell, in which an electrolyte membrane-electrode assembly (MEA) is sandwiched between a pair of separators, the electrolyte membrane-electrode assembly being formed by disposing an anode electrode and a cathode electrode at both sides of a solid polymer electrolyte membrane formed of a polymer ion exchange membrane. In general, a plurality of generation cells are stacked to form a fuel cell stack, which is incorporated, for example, in a fuel cell vehicle to be used as an in-vehicle fuel cell system.

In a fuel cell, what is called an internal manifold is often formed in order to supply a fuel gas and an oxidant gas as a reactant gas to the anode electrode and the cathode electrode, respectively, in each of the stacked generation cells.

The internal manifold is provided with reactant gas communication holes (a fuel gas communication hole and an oxidant gas communication hole) and a cooling medium communication hole which are provided through the generation cells in the stacking direction. The reactant gas communication hole communicates with reactant gas passages (a fuel gas passage and an oxidant gas passage) for supplying a reactant gas along an electrode surface, and the cooling medium communication hole communicates with a cooling medium passage for supplying a cooling medium along an electrode surface between separators.

Figure 10:
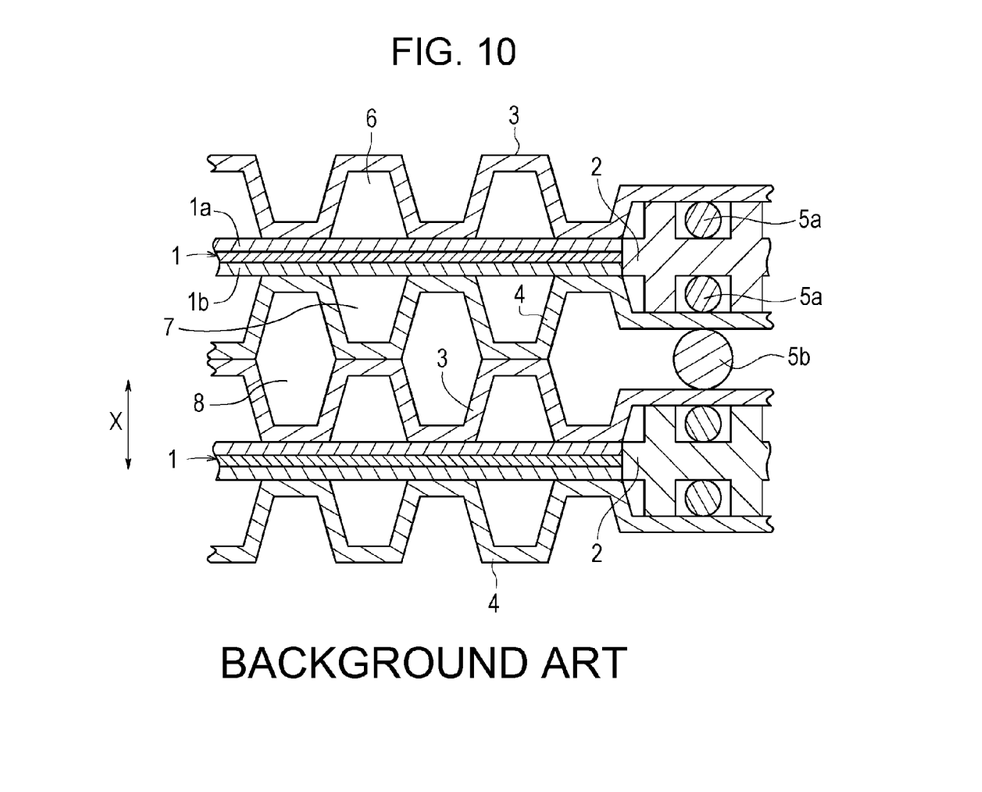
FIG. 10 is a cross-sectional view of a unit cell for a fuel cell, disclosed in Japanese Unexamined Patent Application Publication No. 2006-331783.

For example, a unit cell for a fuel cell, disclosed in Japanese Unexamined Patent Application Publication No. 2006-331783 includes a membrane-electrode assembly 1 which generates power with supplied operating gas, a holding member 2 which holds the membrane-electrode assembly 1 at the periphery, and an anode separator 3 and a cathode separator 4 which sandwich the membrane-electrode assembly 1 and the holding member 2 as illustrated in FIG. 10.

A sealing member 5a is interposed between the anode separator 3, the cathode separator 4, and the holding member 2, and a sealing member 5b is interposed between the anode separator 3 and the cathode separator 4 which are adjacent to each other.

In the anode separator 3, a fuel gas passage 6 is formed which faces an anode electrode 1a of the membrane-electrode assembly 1. In the cathode separator 4, an oxidant gas passage 7 is formed which faces a cathode electrode 1b of the membrane-electrode assembly 1. In addition, a cooling medium channel 8 is formed between the anode separator 3 and the cathode separator 4 which are adjacent to each other.

SUMMARY OF THE INVENTION

According to one aspect of the present invention, a fuel cell includes an electrolyte-electrode assembly, a frame member, a first separator, and a second separator. The electrolyte-electrode assembly includes a first electrode, a second electrode, and an electrolyte membrane disposed between the first electrode and the second electrode in a stacking direction. The frame member is made of resin and disposed around a periphery of the electrolyte-electrode assembly. The second separator is provided between the electrolyte-electrode assembly and the first separator in the stacking direction. The second separator includes a first surface and a second surface opposite to the first surface in the stacking direction. The first surface of the second separator is provided to face the first electrode. The first electrode and the first surface of the second separator defines a first reactant gas passage through which a reactant gas is to flow along an electrode surface of the electrolyte-electrode assembly. The second surface of the second separator is adjacent to the first separator. The first separator and the second surface of the second separator defines a cooling medium passage through which a cooling medium is to flow along the electrode surface. The second separator includes a first reactant gas communication hole through which the first reactant gas is to flow in the stacking direction, a second reactant gas communication hole through which a second reactant gas is to flow in the stacking direction, a cooling medium communication hole through which the cooling medium is to flow in the stacking direction, and a cooling medium connecting portion through which the cooling medium is to flow between the cooling medium passage and the cooling medium communication hole. The frame member faces the first surface of the second separator and including a resin wall which forms a periphery of the first reactant gas passage. The resin wall has a thin-walled portion which overlaps with the cooling medium connecting portion in the stacking direction and which protrudes toward the first reactant gas passage in the stacking direction by a first dimension from a surface of the frame member. Another portion of the resin wall protrudes toward the second separator in the stacking direction by a second dimension from the surface of the frame member. The first dimension is smaller than the second dimension.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
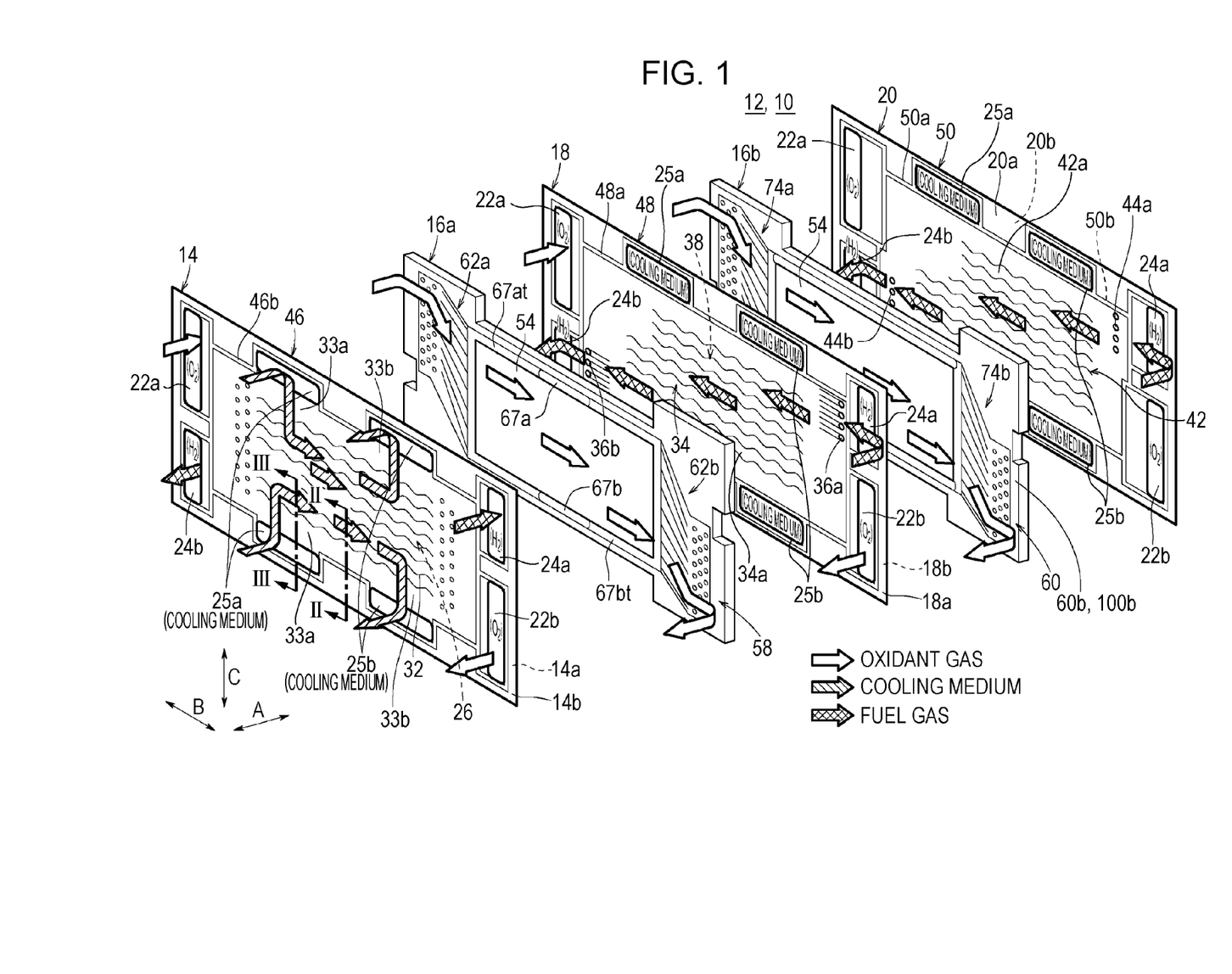
FIG. 1 is an exploded perspective view of a power generation unit included in a fuel cell according to an embodiment of the present disclosure.
Figure 2:
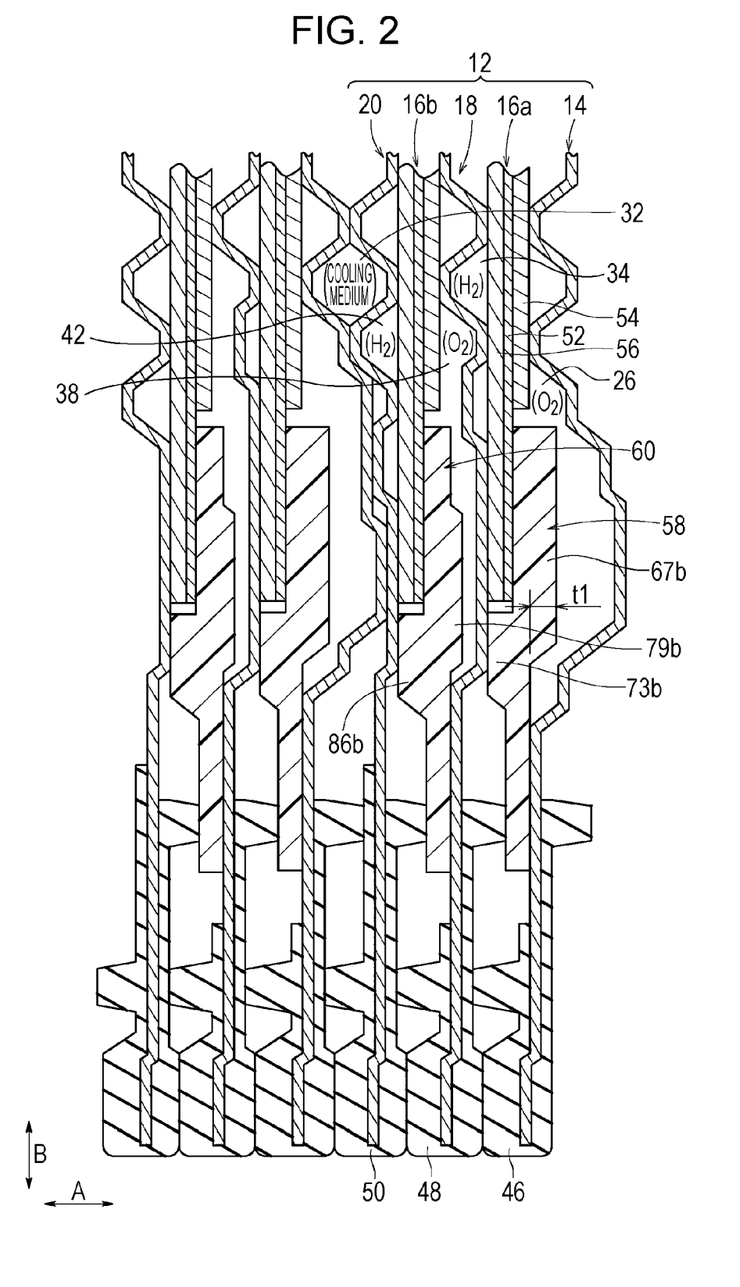
FIG. 2 is a cross-sectional view of the power generation unit taken along a line II-II in FIG. 1.
Figure 3:
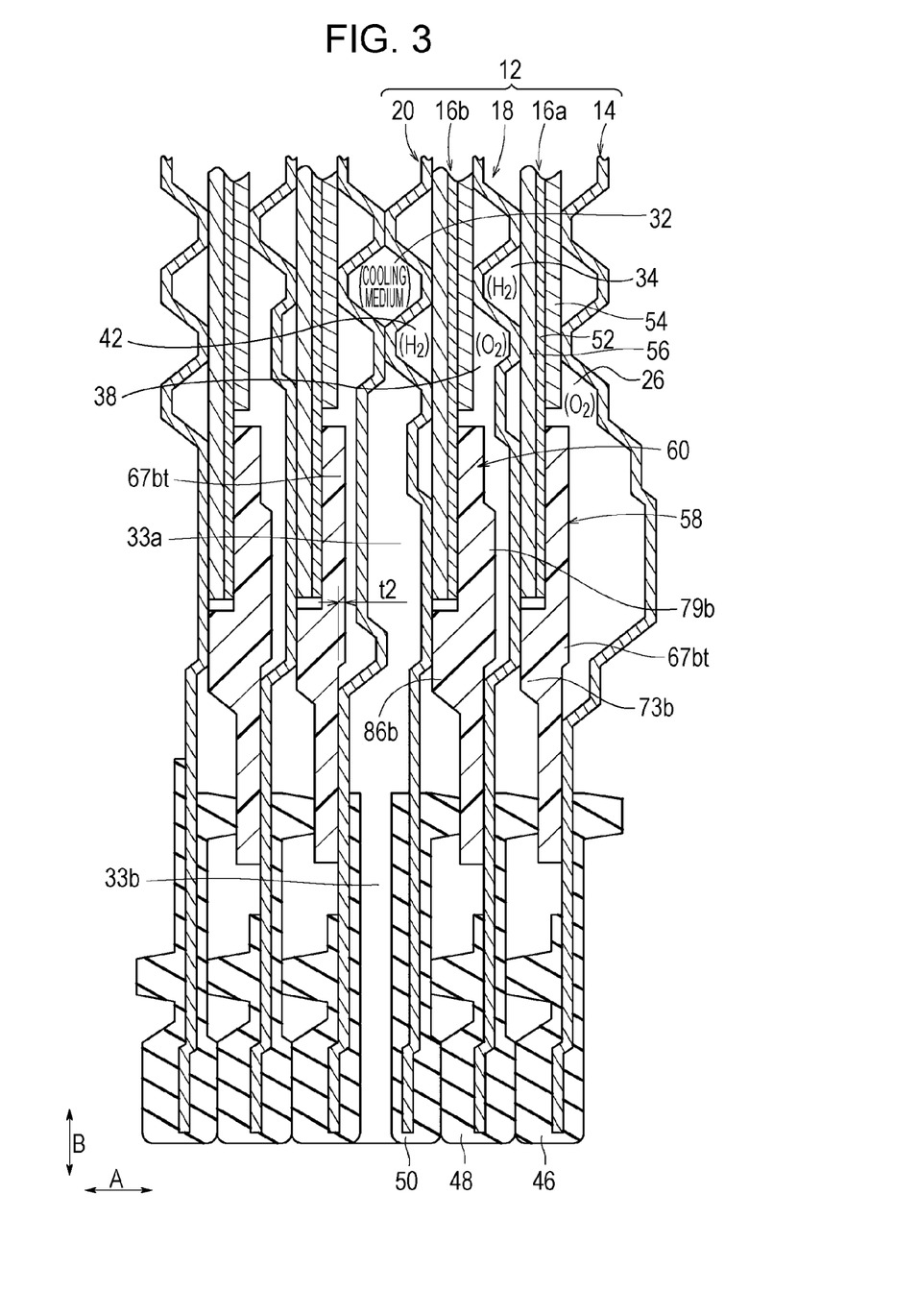
FIG. 3 is a cross-sectional view of the power generation unit taken along a line III-III in FIG. 1.

As illustrated in FIGS. 1 to 3, a fuel cell 10 according to an embodiment of the present disclosure includes a plurality power generation units 12 which are stacked in the horizontal direction (the direction of an arrow A, a stacking direction) or in the vertical direction (the direction of an arrow C). The power generation unit 12 includes a first metal separator 14, a first electrolyte membrane-electrode assembly 16a, a second metal separator 18, a second electrolyte membrane-electrode assembly 16b, and a third metal separator 20.

Each of the first metal separator 14, the second metal separator 18, and the third metal separator 20 is, for example, a steel plate, a stainless steel plate, an aluminum plate, a plated steel plate, or a rectangular metal plate having a surface for which treatment for protection against corrosion has been made. Each of the first metal separator 14, the second metal separator 18, and the third metal separator 20 is formed to have a rectangular planar shape and a corrugated cross section by press working of a thin metal plate into a corrugated pattern. It is to be noted that e.g., a carbon separator may be used instead of the first metal separator 14, the second metal separator 18, and the third metal separator 20.

As illustrated in FIG. 1, one end edge of the power generation unit 12 in the direction of the longer side (the direction of an arrow B), specifically, one end edge of the first metal separator 14, the second metal separator 18, and the third metal separator 20 in the direction of the longer side is provided with an oxidant gas inlet communication hole 22a for supplying an oxidant gas, for example, an oxygen containing gas, and a fuel gas outlet communication hole 24b for discharging a fuel gas, for example, a hydrogen containing gas, each hole communicating through the separators in the direction of the arrow A.

The other end edge of the power generation unit 12 in the direction of the longer side (the direction of an arrow B) is provided with a fuel gas inlet communication hole (a second reactant gas communication hole) 24a for supplying a fuel gas, and an oxidant gas outlet communication hole (a first reactant gas communication hole) 22b for discharging an oxidant gas, each hole communicating through the separators in the direction of the arrow A.

Both end edges of the power generation unit 12 in the direction of the shorter side (the direction of an arrow C) at one side of the edges near the oxidant gas inlet communication hole 22a is provided with a pair of cooling medium inlet communication holes 25a for supplying a cooling medium (coolant), each hole communicating through the separators in the direction of the arrow A. Both end edges of the power generation unit 12 in the direction of the shorter side at the other side of the edges near the fuel gas inlet communication hole 24a is provided with a pair of cooling medium outlet communication holes 25b for discharging a cooling medium.

Figure 4:
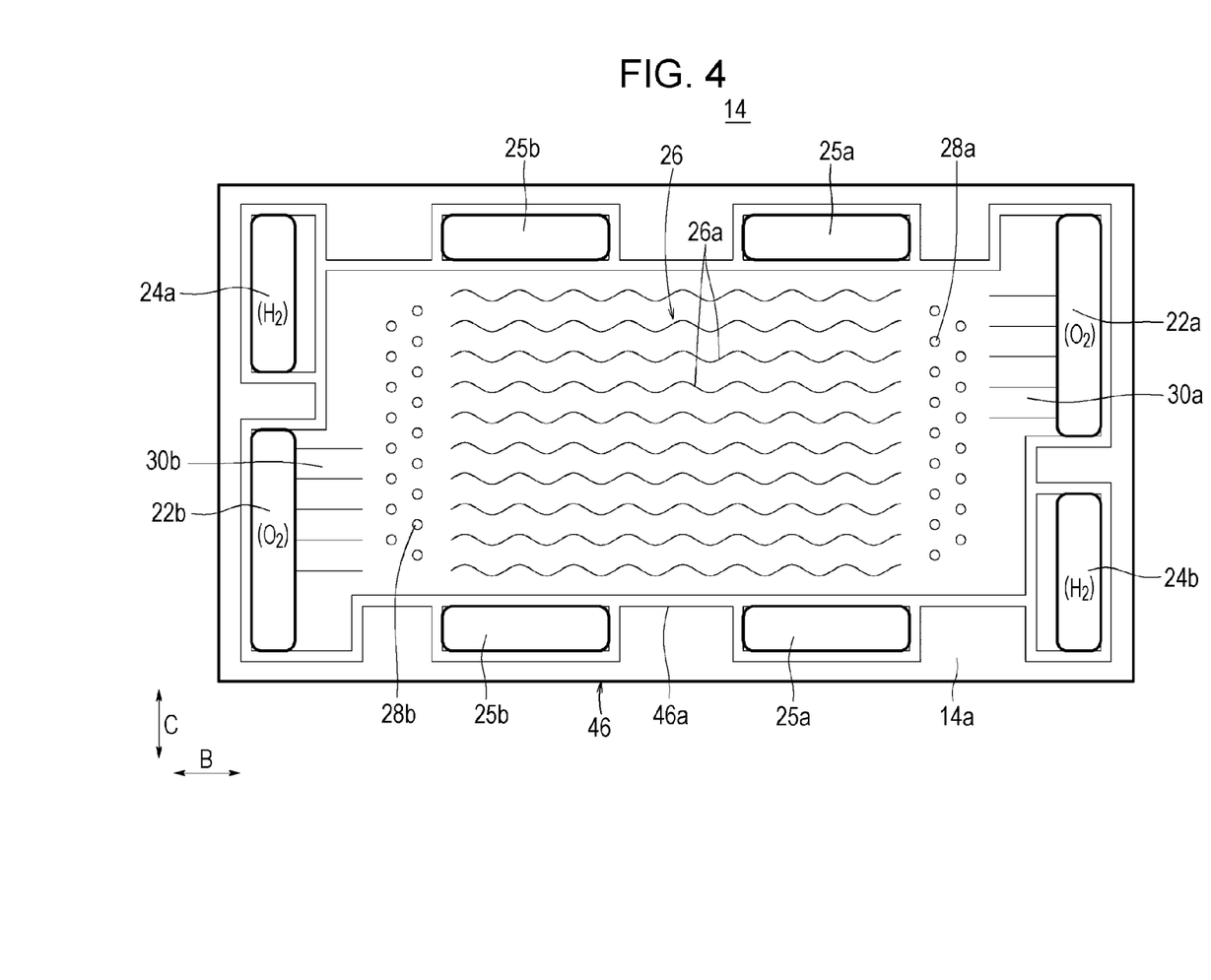
FIG. 4 is a front view of a first metal separator included in the power generation unit.

As illustrated in FIG. 4, on a surface 14a of the first metal separator 14 that faces the first electrolyte membrane-electrode assembly 16a, a first oxidant gas passage (one of reactant gas passages) 26 is formed for communicating the oxidant gas inlet communication hole 22a with the oxidant gas outlet communication hole 22b.

The first oxidant gas passage 26 has a plurality of wavy passage grooves 26a which extend in the direction of the arrow B, and the inlet vicinity and the outlet vicinity of the first oxidant gas passage 26 are provided with a plurality of inlet embossed portions 28a and outlet embossed portions 28b, respectively. It is to be noted that a linear passage groove may be used instead of the wavy passage groove 26a.

A plurality of inlet connection grooves 30a, which constitute a bridge portion, are formed between the inlet embossed portions 28a and the oxidant gas inlet communication hole 22a, and a plurality of outlet connection grooves 30b, which constitute a bridge portion, are formed between the outlet embossed portions 28b and the oxidant gas outlet communication hole 22b.

As illustrated in FIG. 1, on a surface 14b of the first metal separator 14, a cooling medium passage 32 is formed for communicating the cooling medium inlet communication holes 25a with the cooling medium outlet communication holes 25b. The cooling medium passage 32 is formed by joining the rear surface of the first oxidant gas passage 26, and the rear surface of the below-described second fuel gas passage 42 together. The surface 14b of the first metal separator 14 is provided with a pair of inlet cooling medium connecting portions 33a for connecting the cooling medium passage 32 to the cooling medium inlet communication holes 25a, and a pair of outlet cooling medium connecting portions 33b for connecting the cooling medium passage 32 to the cooling medium outlet communication holes 25b.

On a surface 18a of the second metal separator 18 that faces the first electrolyte membrane-electrode assembly 16a, a first fuel gas passage 34 is formed for communicating the fuel gas inlet communication hole 24a with the fuel gas outlet communication hole 24b. The first fuel gas passage 34 has a plurality of wavy passage grooves 34a which extend in the direction of the arrow B. It is to be noted that a linear passage groove may be used instead of the wavy passage groove 34a.

A plurality of supply holes 36a are formed in the vicinity of the fuel gas inlet communication hole 24a, and a plurality of discharge holes 36b are formed in the vicinity of the fuel gas outlet communication hole 24b.

Figure 5:
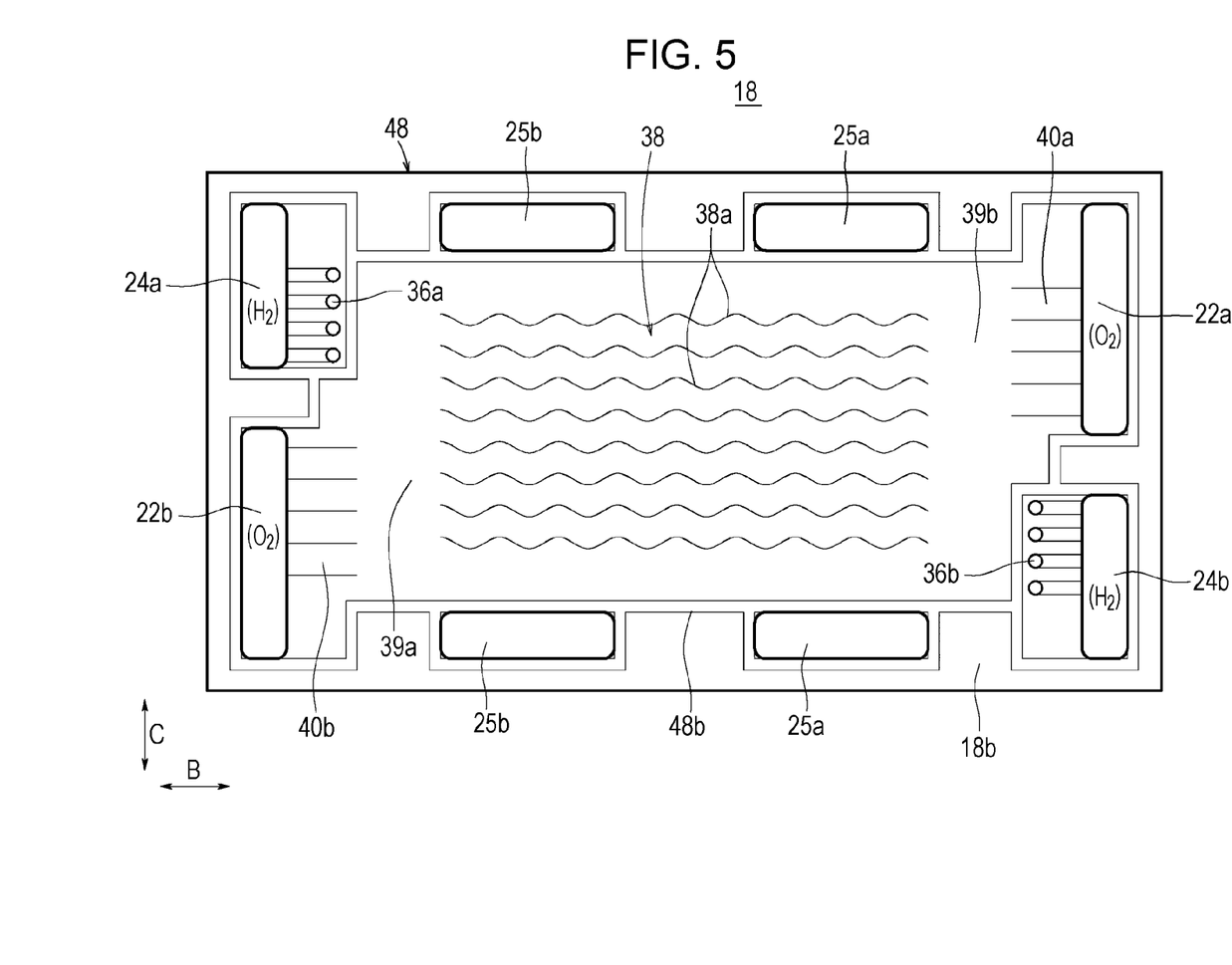
FIG. 5 is a front view of a second metal separator included in the power generation unit.

As illustrated in FIG. 5, on a surface 18b of the second metal separator 18 that faces the second electrolyte membrane-electrode assembly 16b, a second oxidant gas passage 38 is formed for communicating the oxidant gas inlet communication hole 22a with the oxidant gas outlet communication hole 22b. The second oxidant gas passage 38 has a plurality of wavy passage grooves 38a which extend in the direction of the arrow B. It is to be noted that a linear passage groove may be used instead of the wavy passage groove 38a.

A plurality of inlet connection grooves 40a are formed in the vicinity of the oxidant gas inlet communication hole 22a, and a plurality of outlet connection grooves 40b are formed in the vicinity of the oxidant gas outlet communication hole 22b.

As illustrated in FIG. 1, on a surface 20a of the third metal separator 20 that faces the second electrolyte membrane-electrode assembly 16b, a second fuel gas passage 42 is formed for communicating the fuel gas inlet communication hole 24a with the fuel gas outlet communication hole 24b. The second fuel gas passage 42 has a plurality of wavy passage grooves 42a which extend in the direction of the arrow B. It is to be noted that a linear passage groove may be used instead of the wavy passage groove 42a.

A plurality of supply holes 44a are formed in the vicinity of the fuel gas inlet communication hole 24a, and a plurality of discharge holes 44b are formed in the vicinity of the fuel gas outlet communication hole 24b. The supply holes 44a are disposed inwardly (near the fuel gas passages) of the supply holes 36a of the second metal separator 18, whereas the discharge holes 44b are disposed inwardly of the discharge holes 36b of the second metal separator 18.

On the surface 20b of the third metal separator 20, part of the cooling medium passage 32, which is the rear surface of the second fuel gas passages 42, is formed. The cooling medium passage 32 is provided integrally with the surface 20b of the third metal separator 20 and the surface 14b of the first metal separator 14 which is adjacent to the third metal separator 20, the surface 14b being stacked on the surface 20b.

Around the surfaces 14b, 14b of the first metal separator 14, a first sealing member 46 is integrally molded to surround the outer peripheral edge of the first metal separator 14. Around the surfaces 18a, 18a of the second metal separator 18, a second sealing member 48 is integrally molded to surround the outer peripheral edge of the second metal separator 18, and around the surfaces 20a, 20a of the third metal separator 20, a third sealing member 50 is integrally molded to surround the outer peripheral edge of the third metal separator 20.

As the material for the first sealing member 46, the second sealing member 48, and the third sealing member 50, a sealing, cushioning or packing material having elasticity, such as EPDM, NBR, a fluoride rubber, a silicone rubber, a fluoro silicone rubber, a butyl rubber, a natural rubber, a styrene rubber, a chloroprene or acrylic rubber is used.

As illustrated in FIG. 4, the first sealing member 46 has a first projecting sealing portion 46a which communicates with the outer periphery of the oxidant gas inlet communication hole 22a, the oxidant gas outlet communication hole 22b, and the first oxidant gas passage 26 in the surface 14a of the first metal separator 14. As illustrated in FIG. 1, the first sealing member 46 has a second projecting sealing portion 46b which communicates with the outer periphery of the cooling medium inlet communication holes 25a, the cooling medium outlet communication holes 25b, and the cooling medium passage 32 in the surface 14b of the first metal separator 14.

The second sealing member 48 has a first projecting sealing portion 48a which surrounds the supply holes 36a, the discharge holes 36b, and the first fuel gas passage 34 for spatial communication in the surface 18a of the second metal separator 18.

As illustrated in FIG. 5, the second sealing member 48 has a second projecting sealing portion 48b which communicates with the outer periphery of the oxidant gas inlet communication hole 22a, the oxidant gas outlet communication hole 22b, and the second oxidant gas passage 38 in the surface 18b.

As illustrated in FIG. 1, the third sealing member 50 has a first projecting sealing portion 50a which surrounds the supply holes 44a, the discharge holes 44b, and the second fuel gas passage 42 for spatial communication in the surface 20a of the third metal separator 20.

The third sealing member 50 has a second projecting sealing portion 50b which communicates with the outer periphery of the cooling medium inlet communication holes 25a, the cooling medium outlet communication holes 25b, and the cooling medium passage 32 in the surface 20b of the third metal separator 20.

As illustrated in FIGS. 2 and 3, the first electrolyte membrane-electrode assembly 16a and the second electrolyte membrane-electrode assembly 16b each include, for example, a solid polymer electrolyte membrane 52 which is a thin perfluoro sulfonic acid membrane impregnated with water, and a cathode electrode (one of the electrodes) 54 and an anode electrode 56 between which the solid polymer electrolyte membrane 52 is sandwiched. The cathode electrode 54 forms a stepped MEA which has a planar dimension (surface dimension) smaller than the planar dimension (surface dimension) of the anode electrode 56 or the solid polymer electrolyte membrane 52.

Contrarily, the anode electrode 56 may form a stepped MEA which has a planar dimension (surface dimension) smaller than the planar dimension (surface dimension) of the cathode electrode 54.

The cathode electrode 54 and the anode electrode 56 have a gas diffusion layer which is formed of carbon paper or the like, and an electrode catalyst layer which is formed by uniformly coating the surface of the gas diffusion layer with porous carbon particles which carry platinum alloy on the surfaces thereof.

In the first electrolyte membrane-electrode assembly 16a, a first resin frame member 58 is integrally molded, for example, by injection molding located at the outer terminal end of the cathode electrode 54 at the outer peripheral edge of the solid polymer electrolyte membrane 52. The thickness of the first resin frame member 58 is set to be equal to or greater than the thickness of the first electrolyte membrane-electrode assembly 16a.

In the second electrolyte membrane-electrode assembly 16b, a second resin frame member 60 is integrally molded, for example, by injection molding located at the outer terminal end of the cathode electrode 54 at the outer peripheral edge of the solid polymer electrolyte membrane 52. The thickness of the second resin frame member 60 is set to be equal to or greater than the thickness of the second electrolyte membrane-electrode assembly 16b. As the resin material for the first resin frame member 58 and the second resin frame member 60, engineering plastics, super engineering plastics, or the like may be used in addition to general-purpose plastics.

Figure 6:
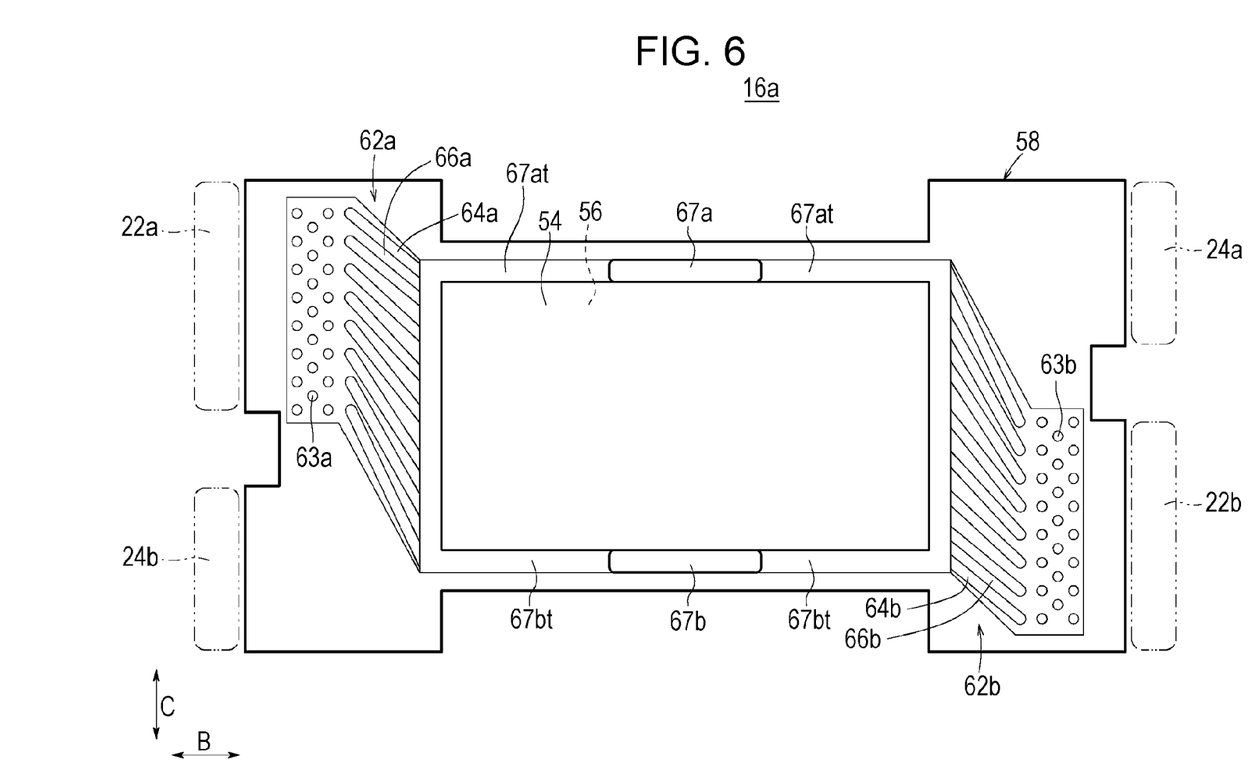
FIG. 6 is a view of one side of a first electrolyte membrane-electrode assembly included in the power generation unit.

As illustrated in FIG. 6, the surface of the first resin frame member 58 that faces the cathode electrode 54 is provided with an inlet buffer 62a which is located between the oxidant gas inlet communication hole 22a and the inlet side of the first oxidant gas passage 26, and with an outlet buffer 62b which is located between the oxidant gas outlet communication hole 22b and the outlet side of the first oxidant gas passage 26.

The inlet buffer 62a has a plurality of linear projecting portions 64a which are integrally molded with the first resin frame member 58, and inlet guide passages 66a are formed between the projecting portions 64a. The outlet buffer 62b has a plurality of linear projecting portions 64b which are integrally molded with the first resin frame member 58, and outlet guide passages 66a are formed between the projecting portions 64b. Embossed portions 63a, 63b are formed in the inlet buffer 62a and the outlet buffer 62b, respectively. It is to be noted that the inlet buffer 62a and the outlet buffer 62b may include linear projecting portions and embossed portions only. The below described buffers also may include linear projecting portions and embossed portions only.

The first resin frame member 58 is provided with resin walls 67a, 67b which form the periphery of the first oxidant gas passage 26. The resin wall 67a is provided at an upper portion of the first resin frame member 58 so as to extend in the direction of the arrow B, whereas the resin wall 67b is provided at a lower portion of the first resin frame member 58 so as to extend in the direction of the arrow B. As illustrated in FIG. 2, the resin walls 67a, 67b are formed to project (have a thickness) in the thickness direction by a dimension of t1 from the surface of the first resin frame member 58.

The resin walls 67a, 67b have thin-walled portions 67 at, 67bt at positions which are overlapped with the inlet cooling medium connecting portion 33a and the outlet cooling medium connecting portion 33b in the stacking direction. As illustrated in FIG. 3, a dimension t2 of the thin-walled portions 67at, 67bt which protrude toward the first oxidant gas passage 26 in the thickness direction is set to be smaller than a dimension t1 (t2<t1) at other areas (the resin walls 67a, 67b) in the thickness direction.

Figure 7:
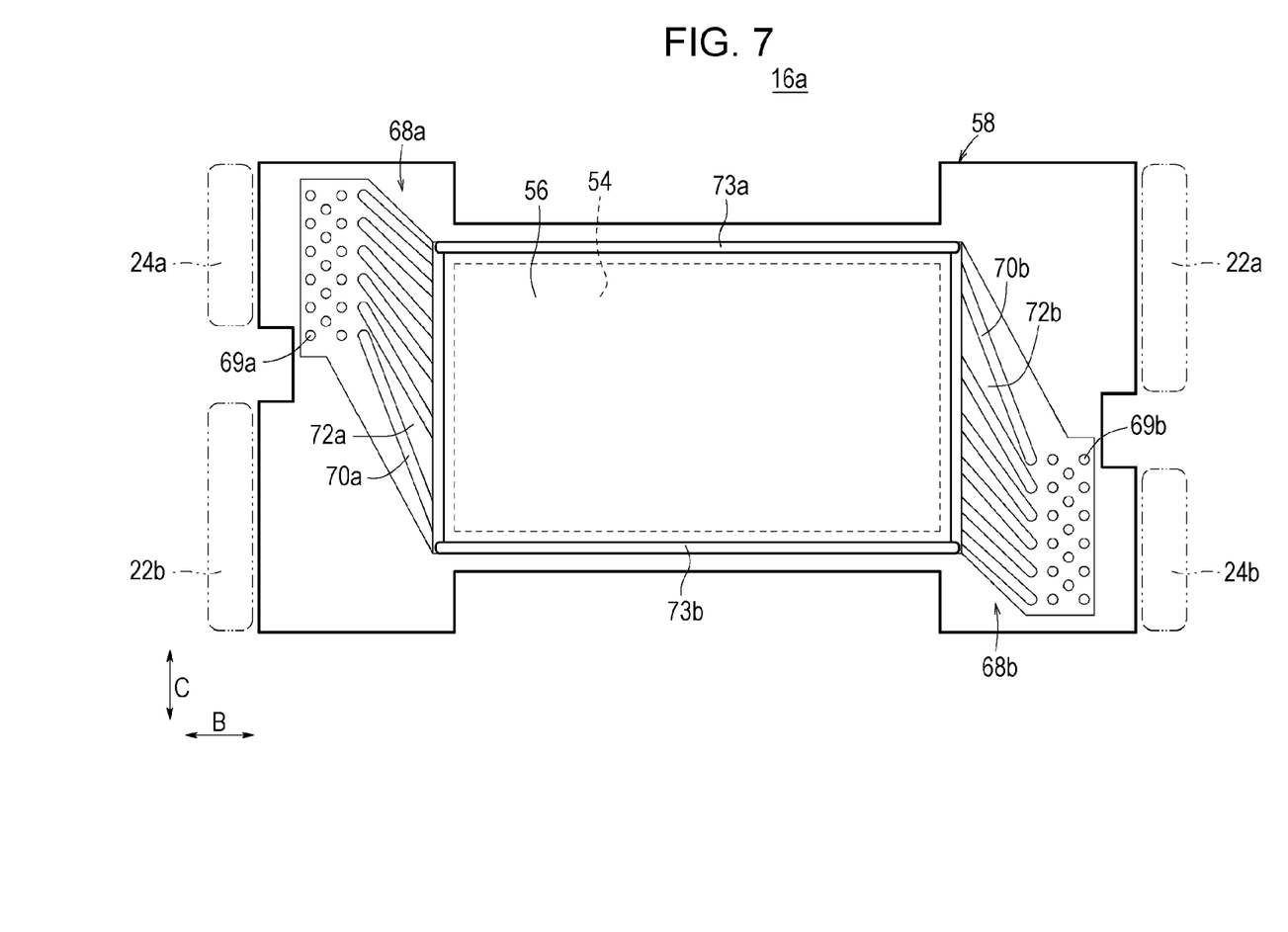
FIG. 7 is a view of the other side of the first electrolyte membrane-electrode assembly.

As illustrated in FIG. 7, the surface of the first resin frame member 58 that faces the anode electrode 56 is provided with an inlet buffer 68a which is located between the fuel gas inlet communication hole 24a and the first fuel gas passage 34, and with an outlet buffer 68b which is located between the fuel gas outlet communication hole 24b and the first fuel gas passage 34.

The inlet buffer 68a has a plurality of linear projecting portions 70a, and inlet guide passages 72a are formed between the projecting portions 70a. The outlet buffer 68b has a plurality of linear projecting portions 70b, and outlet guide passages 72b are formed between the projecting portions 70b. Embossed portions 69a, 69b are formed in the inlet buffer 68a and the outlet buffer 68b, respectively.

The first resin frame member 58 is provided with resin walls 73a, 73b which form the periphery of the first fuel gas passage 34. The resin wall 73a is provided at an upper portion of the first resin frame member 58 so as to extend in the direction of the arrow B, whereas the resin wall 73b is provided at a lower portion of the first resin frame member 58 so as to extend in the direction of the arrow B. The resin walls 73a, 73b are thicker than other areas, and extend to the vicinity of the inlet buffer 68a and the outlet buffer 68b.

Figure 8:
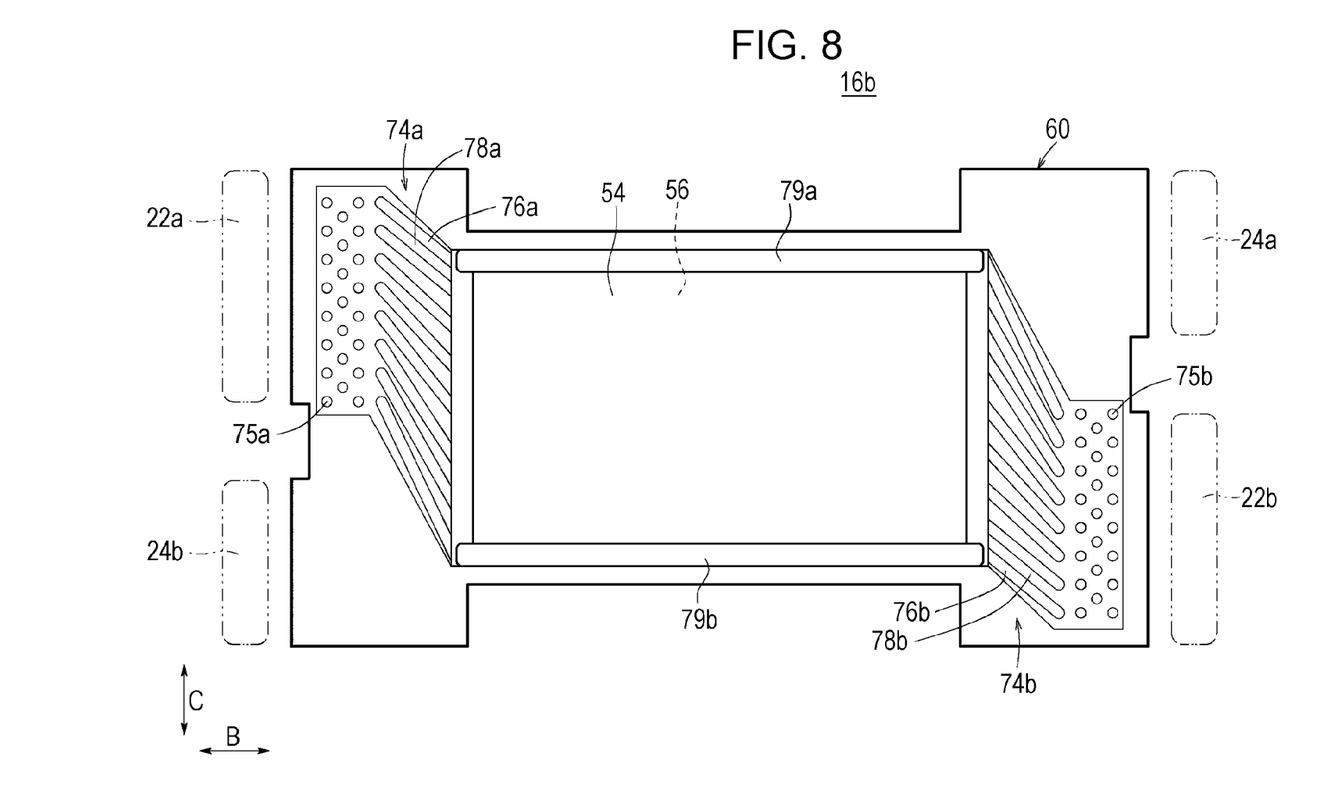
FIG. 8 is a view of one side of a second electrolyte membrane-electrode assembly included in the power generation unit.

As illustrated in FIG. 8, the surface of the second resin frame member 60 that faces the cathode electrode 54 is provided with an inlet buffer 74a which is located between the oxidant gas inlet communication hole 22a and the second oxidant gas passage 38, and with an outlet buffer 74b which is located between the oxidant gas outlet communication hole 22b and the second oxidant gas passage 38.

The inlet buffer 74a has a plurality of linear projecting portions 76a, and inlet guide passages 78a are formed between the projecting portions 76a. The outlet buffer 74b has a plurality of linear projecting portions 76b, and outlet guide passages 78b are formed between the projecting portions 76b. Embossed portions 75a, 75b are formed in the inlet buffer 74a and the outlet buffer 74b, respectively.

The second resin frame member 60 is provided with the resin walls 79a, 79b which form the periphery of the second oxidant gas passage 38. The resin wall 79a is provided at an upper portion of the second resin frame member 60 so as to extend in the direction of the arrow B, whereas the resin wall 79b is provided at a lower portion of the second resin frame member 60 so as to extend in the direction of the arrow B. The resin walls 79a, 79b are thicker than other areas, and extend to the vicinity of the inlet buffer 74a and the outlet buffer 74b.

Figure 9:
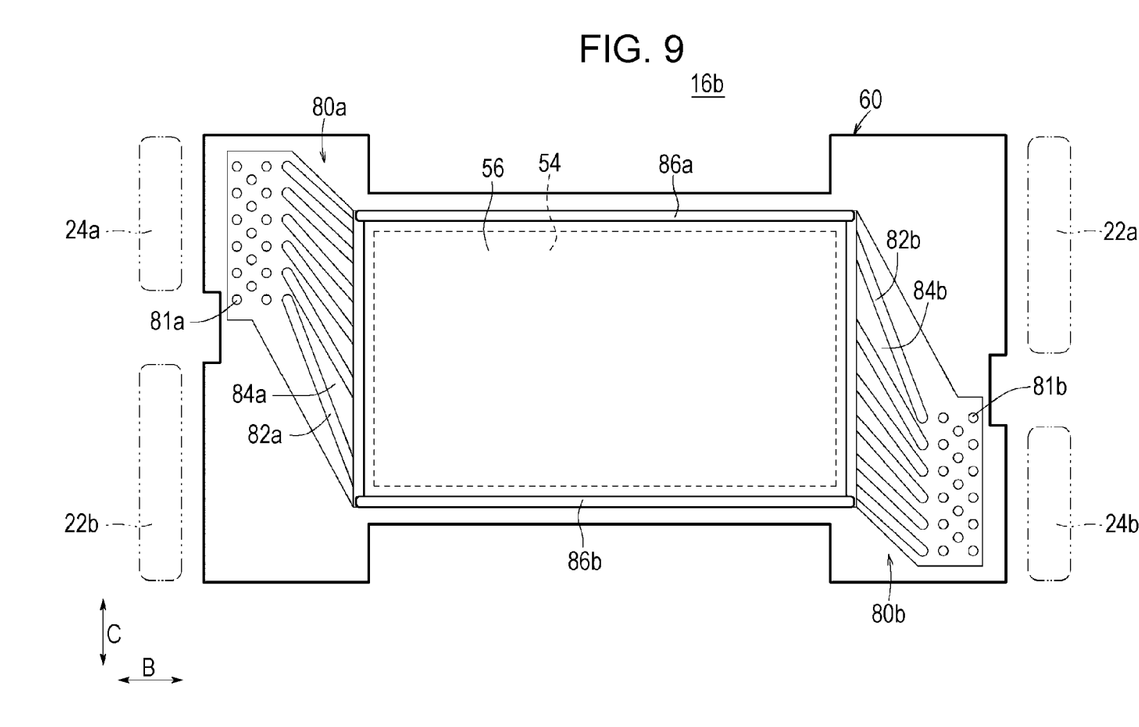
FIG. 9 is a view of the other side of the second electrolyte membrane-electrode assembly.

As illustrated in FIG. 9, the surface of the second resin frame member 60 that faces the anode electrode 56 is provided with an inlet buffer 80a which is located between the fuel gas inlet communication hole 24a and the second fuel gas passage 42, and with an outlet buffer 80b which is located between the fuel gas outlet communication hole 24b and the second fuel gas passage 42.

The inlet buffer 80a has a plurality of linear projecting portions 82a, and inlet guide passages 84a are formed between the projecting portions 82a. The outlet buffer 80b has a plurality of linear projecting portions 82b, and outlet guide passages 84b are provided between the projecting portions 82b. Embossed portions 81a, 81b are formed in the inlet buffer 80a and the outlet buffer 80b, respectively.

The second resin frame member 60 is provided with the resin walls 86a, 86b which form the periphery of the second fuel gas passage 42. The resin wall 86a is provided at an upper portion of the second resin frame member 60 so as to extend in the direction of the arrow B, whereas the resin wall 86b is provided at a lower portion of the second resin frame member 60 so as to extend in the direction of the arrow B. The resin walls 86a, 86b are thicker than other areas, and extend to the vicinity of the inlet buffer 80a and the outlet buffer 80b.

The power generation units 12 are stacked on top of the other, and thus the cooling medium passage 32 is formed between the first metal separator 14 which constitutes one power generation unit 12, and the third metal separator 20 which constitutes the other power generation unit 12.

The operation of the fuel cell 10 with the above configuration will be described below.

First, as illustrated in FIG. 1, an oxidant gas such as oxygen containing gas is supplied to the oxidant gas inlet communication hole 22a, and a fuel gas such as hydrogen containing gas is supplied to the fuel gas inlet communication hole 24a. In addition, cooling media such as pure water, ethylene glycol, or oil is supplied to the cooling medium inlet communication holes 25a.

Thus, an oxidant gas is supplied to the first oxidant gas passage 26 of the first metal separator 14 from the oxidant gas inlet communication hole 22a through the inlet buffer 62a of the first resin frame member 58. The oxidant gas is introduced to the second oxidant gas passage 38 of the second metal separator 18 from the oxidant gas inlet communication hole 22a through the inlet buffer 74a of the second resin frame member 60.

As illustrated in FIGS. 1, 4, and 5, the oxidant gas flows in the direction of the arrow B (horizontal direction) along the first oxidant gas passage 26, and is supplied to the cathode electrode 54 of the first electrolyte membrane-electrode assembly 16a. The oxidant gas flows in the direction of the arrow B (horizontal direction) along the second oxidant gas passage 38, and is supplied to the cathode electrode 54 of the second electrolyte membrane-electrode assembly 16b.

On the other hand, as illustrated in FIGS. 1 and 7, a fuel gas is supplied to the inlet buffer 68a of the first resin frame member 58 from fuel gas inlet communication hole 24a through the supply holes 36a of the second metal separator 18. The fuel gas is supplied to the first fuel gas passage 34 of the second metal separator 18 through the inlet buffer 68a.

The fuel gas is supplied to the inlet buffer 80a of the second resin frame member 60 through the supply holes 44a of the third metal separator 20. The fuel gas is supplied to the second fuel gas passage 42 of the third metal separator 20 through the inlet buffer 80a.

As illustrated in FIGS. 1 and 9, the fuel gas flows in the direction of the arrow B along the first fuel gas passage 34, and is supplied to the anode electrode 56 of the first electrolyte membrane-electrode assembly 16a. The fuel gas flows in the direction of the arrow B along the second fuel gas passage 42, and is supplied to the anode electrode 56 of the second electrolyte membrane-electrode assembly 16b.

Thus, in the first electrolyte membrane-electrode assembly 16a and the second electrolyte membrane-electrode assembly 16b, the oxidant gas supplied to the respective cathode electrodes 54 and the fuel gas supplied to the respective anode electrodes 56 are consumed by an electrochemical reaction in respective electrode catalyst layers, and thus electric power is generated.

Subsequently, the oxidant gas that has been supplied to respective cathode electrodes 54 of the first electrolyte membrane-electrode assembly 16a and the second electrolyte membrane-electrode assembly 16b and consumed is discharged to the oxidant gas outlet communication hole 22b through the outlet buffers 62b, 74b.

The fuel gas that has been supplied to the respective anode electrodes 56 of the first electrolyte membrane-electrode assembly 16a and the second electrolyte membrane-electrode assembly 16b and consumed is introduced to the outlet buffers 68b, 80b. The fuel gas is discharged to the fuel gas outlet communication hole 24b through the discharge holes 36b, and is also discharged to the fuel gas outlet communication hole 24b through the discharge holes 44b.

On the other hand, the cooling medium supplied to the pair of cooling medium inlet communication holes 25a on right and left is introduced into the cooling medium passage 32 as illustrated in FIG. 1. The cooling medium is supplied from each cooling medium inlet communication hole 25a to the cooling medium passage 32, and first flows in the direction of the arrow C, and subsequently, flows in the direction of the arrow B and cools the first electrolyte membrane-electrode assembly 16a and the second electrolyte membrane-electrode assembly 16b. The cooling medium flows in the outward direction of the arrow C, and subsequently, is discharged to the pair of cooling medium outlet communication holes 25b.

In the present embodiment in this case, as illustrated in FIGS. 3 and 6, the first resin frame member 58 is provided with the resin walls 67a, 67b which form the periphery of the first oxidant gas passage 26. The resin walls 67a, 67b have thin-walled portions 67 at, 67bt at positions which are overlapped with the inlet cooling medium connecting portion 33a and the outlet cooling medium connecting portion 33b in the stacking direction.

For this reason, in the inlet cooling medium connecting portion 33a and the outlet cooling medium connecting portion 33b, the heights of passages in the stacking direction may be set to be relatively large. Therefore, the pressure loss of the cooling medium is reduced with a small dimension in the stacking direction, and the effect is obtained that distribution of the cooling medium can be favorably improved.

Furthermore, space can be formed between the first resin frame member 58 and the first metal separator 14, and thus a load applied to the first resin frame member 58 is not fully supported thereby. On the other hand, it is possible to maintain smooth supply of an oxidant gas along the first oxidant gas passage 26.

The resin walls 67a, 67b, 73a, 73b, 79a, 79b, 86a, 86b are thicker than other areas. Thus, bypass of the oxidant gas and the fuel gas is reliably prevented, and the strength of the resin and formability of the resin are easily improved. Consequently, the reactant gas and the cooling medium can be smoothly supplied in a small and compact configuration.

According to the embodiment, a fuel cell includes: an electrolyte-electrode assembly having an electrolyte membrane and a pair of electrodes which are disposed on both sides of the electrolyte membrane, a frame member made of resin being disposed around a periphery of the electrolyte-electrode assembly; and a separator. The electrolyte-electrode assembly and the separator are stacked, and one surface of the separator that faces one electrode is provided with one reactant gas passage for supplying a reactant gas along an electrode surface, and the other surface of the separator is adjacent to another separator and provided with a cooling medium passage for supplying a cooling medium along an electrode surface between the separators.

In the fuel cell according to the embodiment, the fuel cell is provided with a first reactant gas communication hole for supplying one reactant gas in a stacking direction, a second reactant gas communication hole for supplying the other reactant gas in the stacking direction, and a cooling medium communication hole for supplying the cooling medium in the stacking direction, the cooling medium passage and the cooling medium communication hole being connected to each other via a cooling medium connecting portion.

In the fuel cell according to the embodiment, the resin-made frame member which faces one surface of the separator is provided with a resin wall which forms a periphery of one reactant gas passage. The resin wall has a thin-walled portion at a position which is overlapped with the cooling medium connecting portion in the stacking direction, and a dimension of the thin-walled portion which protrudes toward one reactant gas passage in a thickness direction is set to be smaller than dimensions at other areas in a thickness direction. For this reason, in the cooling medium connecting portion, the heights of passages in the stacking direction may be set to be relatively large. Therefore, the pressure loss of the cooling medium is reduced, and thus distribution of the cooling medium can be favorably improved and smooth supply of an oxidant gas can be maintained. Consequently, the reactant gas and the cooling medium can be smoothly supplied in a small and compact configuration.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
an electrolyte-electrode assembly comprising:
   a first electrode;
   a second electrode; and
   an electrolyte membrane disposed between the first electrode and the second electrode in a stacking direction;
a frame member made of resin and disposed around a periphery of the electrolyte-electrode assembly;
a first separator; and
a second separator provided between the electrolyte-electrode assembly and the first separator in the stacking direction, the second separator including a first surface and a second surface opposite to the first surface in the stacking direction, the first surface of the second separator being provided to face the first electrode, the first electrode and the first surface of the second separator defining a first reactant gas passage through which a reactant gas is to flow along an electrode surface of the electrolyte-electrode assembly, the second surface of the second separator being adjacent to the first separator, the first separator and the second surface of the second separator defining a cooling medium passage through which a cooling medium is to flow along the electrode surface, the second separator comprising:
   a first reactant gas communication hole through which the first reactant gas is to flow in the stacking direction;
   a second reactant gas communication hole through which a second reactant gas is to flow in the stacking direction;
   a cooling medium communication hole through which the cooling medium is to flow in the stacking direction; and
   a cooling medium connecting portion through which the cooling medium is to flow between the cooling medium passage and the cooling medium communication hole, the frame member facing the first surface of the second separator and including a resin wall which forms a periphery of the first reactant gas passage, the resin wall having a thin-walled portion which overlaps with the cooling medium connecting portion in the stacking direction and which protrudes toward the first reactant gas passage in the stacking direction by a first dimension from a surface of the frame member, another portion of the resin wall protruding toward the second separator in the stacking direction by a second dimension from the surface of the frame member, the first dimension being smaller than the second dimension.

2. The fuel cell according to claim 1, wherein the resin wall is provided around a periphery of the first electrode.

3. A fuel cell comprising:
an electrolyte-electrode assembly comprising:
  a first electrode;
  a second electrode; and
  an electrolyte membrane disposed between the first electrode and the second electrode in a stacking direction;
a frame member made of resin and disposed around a periphery of the electrolyte-electrode assembly;
a first separator; and
a second separator including a first surface and a second surface opposite to the first surface in the stacking direction, the first surface of the second separator being provided to face the first electrode, the first electrode and the first surface of the second separator defining a first reactant gas passage through which a reactant gas is to flow along an electrode surface of the electrolyte-electrode assembly, the second surface of the second separator being adjacent to the first separator, the first separator and the second surface of the second separator defining a cooling medium passage through which a cooling medium is to flow along the electrode surface, the second separator comprising:
  a first reactant gas communication hole through which the first reactant gas is to flow in the stacking direction;
  a second reactant gas communication hole through which a second reactant gas is to flow in the stacking direction;
  a cooling medium communication hole through which the cooling medium is to flow in the stacking direction; and
  a cooling medium connecting portion through which the cooling medium is to flow between the cooling medium passage and the cooling medium communication hole,
wherein the frame member faces the first surface of the second separator and includes a resin wall which forms a periphery of the first reactant gas passage, the resin wall has:
  a thin-walled portion which overlaps with the cooling medium connecting portion in the stacking direction and which protrudes toward the first reactant gas passage in the stacking direction by a first dimension from a surface of the frame member; and
  another portion protruding toward the second separator in the stacking direction by a second dimension from the surface of the frame member, the first dimension being smaller than the second dimension, and
wherein the frame member including the resin wall having the thin-walled portion and the another portion is a single structure.

4. The fuel cell according to claim 3, wherein the resin wall is provided around a periphery of the first electrode.

* * * * *